US012260249B2

(12) United States Patent
Li et al.

(10) Patent No.: US 12,260,249 B2
(45) Date of Patent: Mar. 25, 2025

(54) PROCESSING SYSTEM, INTER-PROCESSOR COMMUNICATION METHOD, AND SHARED RESOURCE MANAGEMENT METHOD

(71) Applicant: Black Sesame Technologies Inc., San Jose, CA (US)

(72) Inventors: Shengnan Li, Shenzhen (CN); Zhitao Wang, Shenzhen (CN)

(73) Assignee: Black Sesame Technologies Inc., San Jose, CA (US)

( * ) Notice: Subject to any disclaimer, the term of this patent is extended or adjusted under 35 U.S.C. 154(b) by 611 days.

(21) Appl. No.: 17/482,125

(22) Filed: Sep. 22, 2021

(65) Prior Publication Data
US 2022/0091884 A1 Mar. 24, 2022

(51) Int. Cl.
G06F 9/48 (2006.01)
G06F 9/30 (2018.01)
G06F 9/54 (2006.01)

(52) U.S. Cl.
CPC ........ *G06F 9/4881* (2013.01); *G06F 9/30101* (2013.01); *G06F 9/4812* (2013.01); *G06F 9/546* (2013.01)

(58) Field of Classification Search
None
See application file for complete search history.

(56) References Cited

U.S. PATENT DOCUMENTS 4,642,630 A * 2/1987 Beckner ............... H04L 12/403
710/240
4,937,736 A * 6/1990 Chang ................ G06F 12/1475
711/208

(Continued)

FOREIGN PATENT DOCUMENTS

CN 1670721 A 9/2005
CN 1716186 A 1/2006
(Continued)

OTHER PUBLICATIONS

A. Nguyen, N. Satish, J. Chhugani, C. Kim and p. Dubey, "3.5-D Blocking Optimization for Stencil Computations on Modern CPUs and GPUs," SC '10: Proceedings of the 2010 ACM/IEEE International Conference for High Performance Computing, Networking, Storage and Analysis, New Orleans, LA, USA, 2010, pp. 1-13, doi: 10.1109/SC.2010.2.

*Primary Examiner* — Adam Lee
(74) *Attorney, Agent, or Firm* — Timothy T. Wang; Ni, Wang & Massand, PLLC (57) ABSTRACT

The disclosure provides a processing system which comprises a plurality of processors independently executing instructions; a plurality of registers arranged in a manner corresponding to the plurality of processors. Each of the plurality of registers is configured to set first register bits for other processors except the corresponding processor, and the other processors can write the first register bits set for them to indicate event requests. And each processor of the plurality of processors is configured to learn the event requests from the remaining processors for it by reading the first register bits of the corresponding register. Therefore, the application establishes an inter-processor communication module for a plurality of processors in a processing system.

20 Claims, 6 Drawing Sheets

(56) References Cited

U.S. PATENT DOCUMENTS

| | | | | |
|---|---|---|---|---|
| 5,408,629 | A * | 4/1995 | Tsuchiya | G06F 9/52 |
| | | | | 711/151 |
| 5,578,953 | A * | 11/1996 | Nuckols | H03K 3/037 |
| | | | | 327/198 |
| 6,456,628 | B1 * | 9/2002 | Greim | G06F 12/0284 |
| | | | | 711/E12.013 |
| 6,742,135 | B1 * | 5/2004 | Wu | G06F 9/526 |
| | | | | 710/200 |
| 6,845,419 | B1 * | 1/2005 | Moyer | G06F 13/26 |
| | | | | 710/262 |
| 7,174,406 | B1 * | 2/2007 | Abdallah | G06F 13/1663 |
| | | | | 710/242 |
| 11,416,749 | B2 * | 8/2022 | Bshara | G06N 3/063 |
| 2004/0111570 | A1 * | 6/2004 | Arimilli | G06F 12/0831 |
| | | | | 711/E12.033 |
| 2006/0070079 | A1 * | 3/2006 | Franchuk | H04L 12/403 |
| | | | | 719/315 |
| 2007/0043936 | A1 | 2/2007 | Day et al. | |
| 2007/0050527 | A1 * | 3/2007 | Tuan | G06F 9/52 |
| | | | | 710/200 |
| 2007/0150665 | A1 * | 6/2007 | Arimilli | G06F 12/0815 |
| | | | | 711/162 |
| 2009/0019196 | A1 * | 1/2009 | Chew | H04L 47/50 |
| | | | | 710/54 |
| 2011/0161540 | A1 * | 6/2011 | Chang | G06F 9/526 |
| | | | | 710/200 |
| 2015/0277998 | A1 * | 10/2015 | Knox | G06F 9/4818 |
| | | | | 719/318 |
| 2016/0291974 | A1 | 10/2016 | Lingam et al. | |
| 2018/0365078 | A1 * | 12/2018 | Sakai | G06F 9/45558 |
| 2020/0210248 | A1 * | 7/2020 | Dupont de Dinechin | G06F 9/30087 |

FOREIGN PATENT DOCUMENTS

| | | |
|---|---|---|
| CN | 101000593 A | 7/2007 |
| CN | 102063337 A | 5/2011 |
| CN | 103019835 A | 4/2013 |
| CN | 104111870 A | 10/2014 |
| CN | 109144749 A | 1/2019 |
| CN | 109933549 A | 6/2019 |

* cited by examiner

PROCESSING SYSTEM, INTER-PROCESSOR COMMUNICATION METHOD, AND SHARED RESOURCE MANAGEMENT METHOD

FIELD OF THE INVENTION

The current disclosure relates to a processing system, and more particularly, to an inter-processor communication technology and a shared resource management technology for a processing system including a plurality of processors.

BACKGROUND OF THE INVENTION

On-board chips are usually made into heterogeneous SOC (System-on-a-Chip) chips containing multiple processors because of their integration of multiple functions. These processors are secure CPUs, including application CPUs, DSPs and various self-developed accelerators.

In order to complete system-level tasks better, each processor needs to keep communication with other processors, that is, inter-processor communication, in addition to completing its own task. The improvement of inter-processor communication efficiency between processors is one of the key factors to improve the performance of the whole SOC.

At present, there are two ways of inter-processor communication. One is that each processor keeps polling the same memory space to realize inter-processor communication. In this way, because the processor needs to constantly query the status, it causes waste of the processor resource.

Another way is to interrupt periodically through timers, and each processor can query the memory when it generates an interrupt, which can reduce the waste of processor resource, but many timers need to be set to do this work specially.

It is necessary to propose an improved technical scheme for inter-processor communication.

SUMMARY OF THE INVENTION

Accordingly, the current disclosure provides an improved inter-processor communication technology. According to one aspect of the application, a processing system is provided, which comprises a plurality of processors independently executing instructions; and a plurality of registers arranged in a manner corresponding to the plurality of processors. Each of the plurality of registers is configured to set first register bits for other processors except the corresponding processor, and the other processors can write the first register bits set for them to indicate event requests; and each processor of the plurality of processors is configured to learn the event requests from the remaining processors by reading the first register bits of the corresponding register.

According to another aspect of the current disclosure, an inter-processor communication method is provided, which is applied to a processing system including a plurality of processors and a plurality of registers arranged in a manner corresponding to the plurality of processors. According to the method, a source processor of the plurality of processors that has an event request writes to a first register bit of a register corresponding to a target processor of the plurality of processors that is requested to process the event request, wherein the first register bit being written is associated with the source processor; the register sends an interrupt request to the target processor; the target processor reads the register and learns the event request when reading the value of the first register bit associated with the source processor; and the first register bit being written is cleared after the reading operation.

According to another aspect of the current disclosure, there is also provided a processing system, which comprises a plurality of processors which independently execute instructions, and each processor is configured to acquire a corresponding resource lock before using shared resource; a resource lock manager which is electrically connected with the plurality of processors respectively, and is configured to receive a resource lock request sent by any one of the plurality of processors and make a response, wherein the response comprises allocating a resource lock to the processor sending the resource lock request, and/or recording the processors that send the resource lock requests but are not allocated the resource lock and sending them request failure signals.

According to another aspect of the current disclosure, there is also provided a shared resource management method, which is applied to a processing system including a plurality of processors, wherein a resource lock manager is arranged in the processing system, and the method comprises the following steps: a processor of the plurality of processors that requests the resource lock sending a resource lock request to the resource lock manager;

the resource lock manager allocating the resource lock to the processor requesting the resource lock when the requested resource lock is available and only one processor requests the resource lock, or allocating the resource lock to one of the processors requesting the shared resource lock according to a preset allocation mechanism when the shared resource lock is available and more than one processors request the resource lock; and the resource lock manager registers the processors failed to get the requested resource lock, and sending them signals indicating that the requests are failed.

DETAILED DESCRIPTION OF THE INVENTION

In order to make the above objects, features and advantages of the current disclosure more obvious and understandable, the specific embodiments of the current disclosure will be described in detail with reference to the accompanying drawings. In the following description, numerous specific details are set forth in order to provide a thorough understanding of the current disclosure. However, the disclosure can be implemented in many other ways different from those described here, and those skilled in the art can make similar improvements without violating the connotation of the disclosure, so the invention is not limited by the specific implementation disclosed below.

Figure 1:
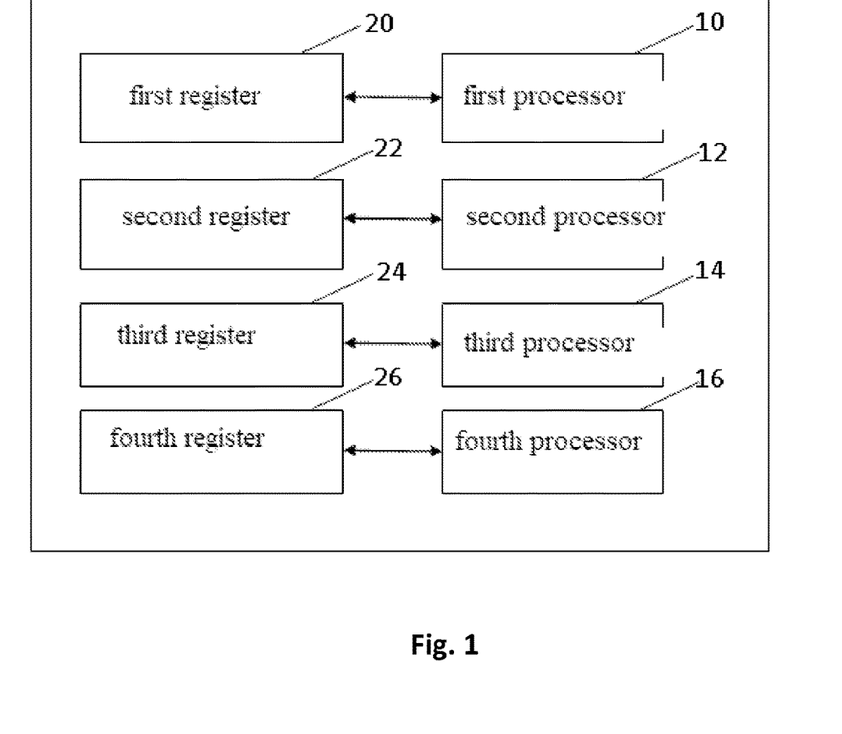
FIG. 1 is a schematic structural diagram of a processing system 1 according to an example of the current disclosure.

FIG. 1 is a schematic structural diagram of a processing system according to an example of the present application. It should be understood that only parts of the processing system related to this disclosure are illustrated here, and for the sake of brevity, the devices such as logic devices and connection relationships included in the processing system are not shown.

According to an example of the current disclosure, the processing system 1 includes a plurality of processors and a plurality of registers, wherein the registers are set in a manner corresponding to the processors. According to the example of this disclosure, each processor is provided with a corresponding register. In the example described with reference to FIG. 1, the disclosure will be explained by taking the processing system 1 including four processors as an example, but it should be understood that the processing system 1 may include other numbers of processors and is not limited to the situation shown. As shown in FIG. 1, the processing system 1 includes four registers, each corresponding to a processor. It should be noted that although the relationship between processors and registers is one-to-one in the example of this application, in practical applications, their corresponding relationship is not necessarily the same, for example, one register may correspond to two processors, or two registers may correspond to one processor, etc.

Referring to FIG. 1, a first processor 10 corresponds to a first register 20, a second processor 12 corresponds to a second register 22, a third processor 14 corresponds to a third register 24 and a fourth processor 16 corresponds to a fourth register 26. In this disclosure, "the register corresponding to the processor" means that the processor can read the event requests of other processors for it from this register; and in some examples, the processor can enable or mask the event requests of other processors for it by writing the register.

According to the disclosure, each register of the plurality of registers is configured to set first register bits for other processors except the processor corresponding to it (also called "corresponding processor"), and these other processors can write the first register bits set for them. In the example shown in FIG. 1, the first register 20 is configured to set first register bits for the second processor 12, the third processor 14 and the fourth processor 16 other than its corresponding processor, i.e., the first processor 10. The second register 22 is configured to set first register bits for the first processor 10, the third processor 14 and the fourth processor 16 other than its corresponding processors, i.e., the second processor 12. The third register 24 is configured to set first register bits for the first processor 10, the second processor 12, and the fourth processor 16 other than its corresponding processors, i.e., the third processor 14. The fourth register 26 is configured to set first register bits for the first processor 10, the second processor 12, and the third processor 14 other than its corresponding processors, i.e., the fourth processor 16.

The first processor 10 can write the first register bit set for it in the second register 22 to indicate that it has an event request for the second processor 12, can write the first register bit set for it in the third register 24 to indicate that it has an event request for the third processor 14, and can write the first register bit set for it in the fourth register 26 to indicate that it has an event request for the fourth processor 16. Similarly, the second processor 12 can write the first register bit set for it in the first register 20, can write the first register bit set for it in the third register 24, and can write the first register bit set for it in the fourth register 26 to indicate its event requests for the first processor 10, the third processor 14, and the fourth processor 16 respectively. The third processor 14 can write the first register bit set for it in the second register 22, can write the first register bit set for it in the first register 20, and can write the first register bit set for it in the fourth register 26 to indicate its event requests for the first processor 10, the second processor 12 and the fourth processor 16 respectively. The fourth processor 16 can write the first register bit set for it in the second register 22, can write the first register bit set for it in the third register 24, and can write the first register bit set for it in the first register 20 to indicate its event requests for the first processor 10, the second processor 12 and the third processor 14 respectively.

According to the disclosure, each processor of the plurality of processors is configured to be able to read the first register bit in the corresponding register to learn the event requests from other processors for it. In FIG. 1, the first processor 10 can read the first register bits in the first register 20 to learn the event request information from the second processor 12, the third processor 14 and the fourth processor 16. The second processor 12 can read the first register bits in the second register 22 to learn the event request information from the first processor 10, the third processor 14 and the fourth processor 16. The third processor 14 can read the first register bits in the third register 24 to learn the event request information from the first processor 10, the second processor 12 and the fourth processor 16. The fourth processor 16 can read the first register bits in the fourth register 26 to learn the event request information from the first processor 10, the second processor 12 and the third processor 14. According to the example of this application, each processor can clear the first register bits after reading the register.

According to some examples of this disclosure, each of the plurality of registers may also be configured to set second register bits for the remaining processors other than the corresponding processor, so that the corresponding processor can enable or mask the remaining processors through the second register bits. Accordingly, the registers 20, 22, 24 and 26 in FIG. 1 are also provided with second register bits, respectively. The register 20 sets second register bits for the remaining processors i.e., the second processor 12, the third processor 14 and the fourth processor 16 except the corresponding processor 10, so that the processor 10 can enable or mask the remaining processors through their respective second register bits. The register 22 sets second register bits for the remaining processors i.e., the first processor 10, the third processor 14 and the fourth processor 16 except the corresponding processor 12, so that the processor 12 can enable or mask the remaining processors through their respective second register bits. The register 24 sets second register bits for the remaining processors i.e., the first processor 10, the second processor 12, and the fourth processor 16 except the corresponding processor 14, so that the processor 14 can enable or mask the remaining processors through their respective second register bits. The register 26 sets second register bits for the remaining processors i.e., the first processor 10, the second processor 12 and the third processor 14 except the corresponding processor 16, so that the processor 16 can enable or mask the remaining processors through their respective second register bits.

Figure 2:
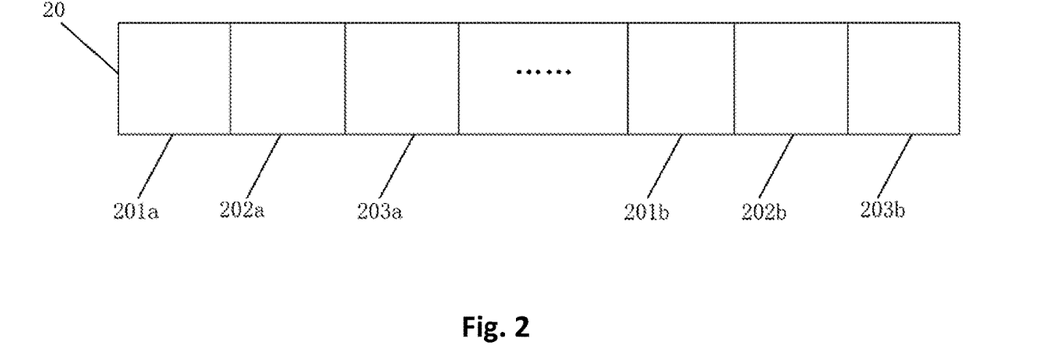
FIG. 2 illustrates a plurality of first register bits and a plurality of second register bits of a first register 20 in FIG. 1.

Next, the second register bits will be discussed in conjunction with the first register 20 with reference to FIG. 2. FIG. 2 illustrates the first register bits and second register bits of the first register 20. As shown in the figure, by way of example but not limitation, a bit 201*a* of the first register 20 is the first register bit for the second processor 12, a bit 202*a* of the first register 20 is the first register bit for the third processor 14, and a bit 203*a* of the first register 20 is the first register bit for the fourth processor 16. A bit 201*b* of the first register 20 is the second register bit for the second processor 12, a bit 202*b* of the first register 20 is the second register bit for the third processor 14, and a bit 203*b* of the first register 20 is the second register bit for the fourth processor 16.

Referring to FIGS. 1 and 2 at the same time, the first register 20 is provided corresponding to the first processor 10. According to the application, any one of the second processor 12, the third processor 14, and the fourth processor 16 requests an event to the first processor 10 by writing the bit set for it in the first register 20, for example, writing 1. For example, there is a system task that needs to be completed by the third processor 14 together with the first processor 10, wherein the third processor 14 completes the upper part and the first processor 10 completes the remaining part. To execute the system task in sequence, the third processor 14 completes the first half of the system tasks. When the third processor 14 finishes the first half, it needs to inform the first processor 10 to process the rest of the system task. According to an example of the current disclosure, the third processor 14 writes 1 to the bit 202*a* of the first register 20. Therefore, the first processor 10 queries the first register bit of the first register 20, and when the value of the bit 202*a* is 1, it can learn the event request of the third processor 14. The first processor 10 reads the bit 202*a* and clears it. According to an example of this disclosure, the first processor 10 may also enable or mask the event requests to the first processor 10 from other processors by operating the second register bit of the first register 20. For example, the first processor 10 writes 1 to the bit 202*b* of the first register 20 to mask the event request to the first processor 10 from the third processor 14. In this way, after the third processor 14 completes a part of the system task, it will not be able to send an event request to the first processor 10.

According to some examples of this disclosure, if there are many event requests sent by a source processor to a target processor, a storage space is set for the source processor and the target processor, so that the target processor can query the storage space for each event state after learning the event requests, so as to confirm which event is processed specifically. In all examples of this application, the source processor refers to the processor that sends the event request, and the target processor is the processor that is requested to process the event request. For example, the third processor 14 may send three event requests to the first processor 10. In this case, for example, an inter-processor storage area may be set for the first processor 10 and the third processor 14. During the write operation of the third processor 14 to the corresponding register 20 of the first processor 10, the information related to these three event requests is written to the inter-processor storage area. Accordingly, the first processor 10 learns that the third processor 14 has event requests for it, but before executing the event requests, it queries the inter-processor storage area to obtain the information related to the three events, and then, for example, determines the sequential order of processing these events. In this example, the third processor 14 is the source processor because it sends event requests to the first processor 10, and accordingly, the first processor 10 is the target processor.

In this example, instead, the third processor 14 may write 1 to the bit 202*b* of the first register 20 three times, and at the same time, a set timer may record how many times the third processor 14 writes 1. When the first processor 10 reads the first register bit of the first register 20, it reads the 1 of 202*b*, and every time the 1 is read, it clears once. By recording the number of times of clearing through the set timer, it can learn that the third processor 14 has three event requests for it.

According to an example of this disclosure, each processor may include one core, or integrate one core, or may be a processor including two or more cores.

Therefore, it should be understood that the technical scheme of this disclosure is applicable to the case where each processor is a core. Taking FIG. 1 as an example, the first processor, the second processor, the third processor and the fourth processor are cores that can independently execute instructions. In this case, the processing system of FIG. 1 itself may be implemented as a processor including a plurality of cores.

Figure 3:
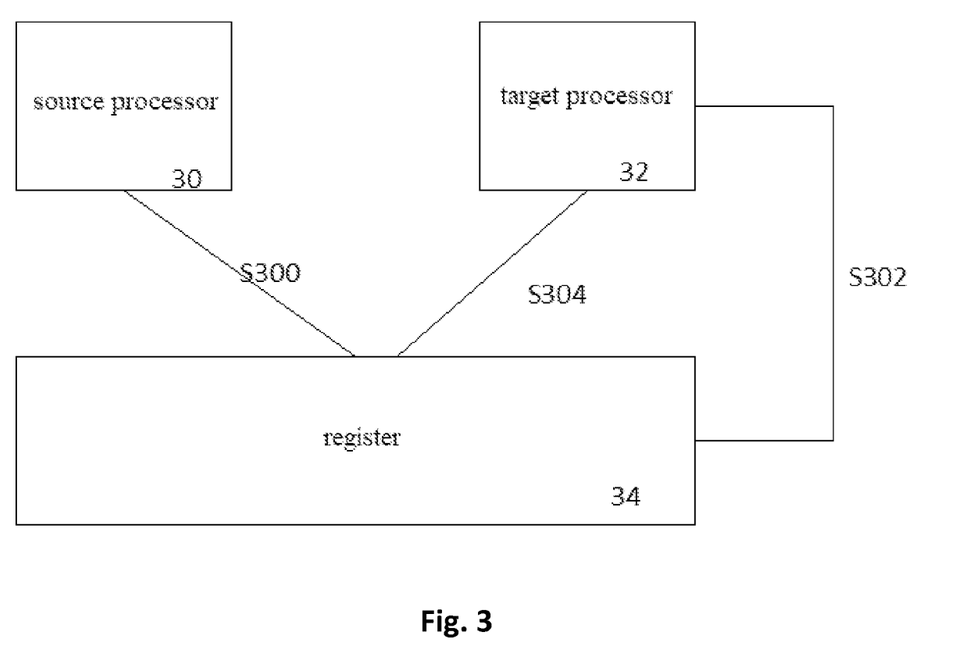
FIG. 3 is a process of communication between a source processor and a target processor according to an example of the current disclosure.

FIG. 3 is a process of communication between a source processor and a target processor according to an example of the current disclosure. In this example, an interrupt register 34 is provided between the source processor 30 and the target processor 32. The register 34 is set corresponding to the target processor 32. In this example, only the source processor 30 is illustrated, but actually there may be more processors. The register 34 sets a first register bit associated with the source processor 30, and the source processor 30 sends an event request to the target processor 32 by writing its first register bit. Here, the first register bit associated with the source processor 30 set by the register 34 is the first register bit for the source processor 30 set by the register 34 corresponding to the target processor 32.

At step S300, the source processor 30 writes to the first register bit associated with it in the register 34, so as to request an event to the target processor 32. According to this example, the first register bit associated with the source processor 30 in the register 34 is the first register bit set in the register 34 for the source processor 30, and according to this example, the source processor 30 writes 1 to the first register bit associated with it in the register 34. At step S302, the register 50 sends an interrupt request to the target processor 32. At step S304, after receiving the interrupt request from the register 34, the target processor 32 queries the register 34, and when reading the 1 of the first register bit for the source processor 30, it learns that the source processor 30 sends the event request to it, and clears this bit. So far, the notification of the event request is realized between the source processor 30 and the target processor 32 by writing and reading the register.

According to the current disclosure, the target processor 32 queries the first bit of the corresponding register in response to the interrupt request, so there is no need to constantly poll the predefined storage area for inter-processor communication as in the prior art, and there is no need for the source processor to periodically interrupt through a timer.

As an example, when the source processor 30 has a plurality of event requests for the target processor 32, an inter-processor storage area may be utilized as between the third processor 14 and the first processor 10 as described above with reference to FIGS. 1 and 2.

Figure 4:
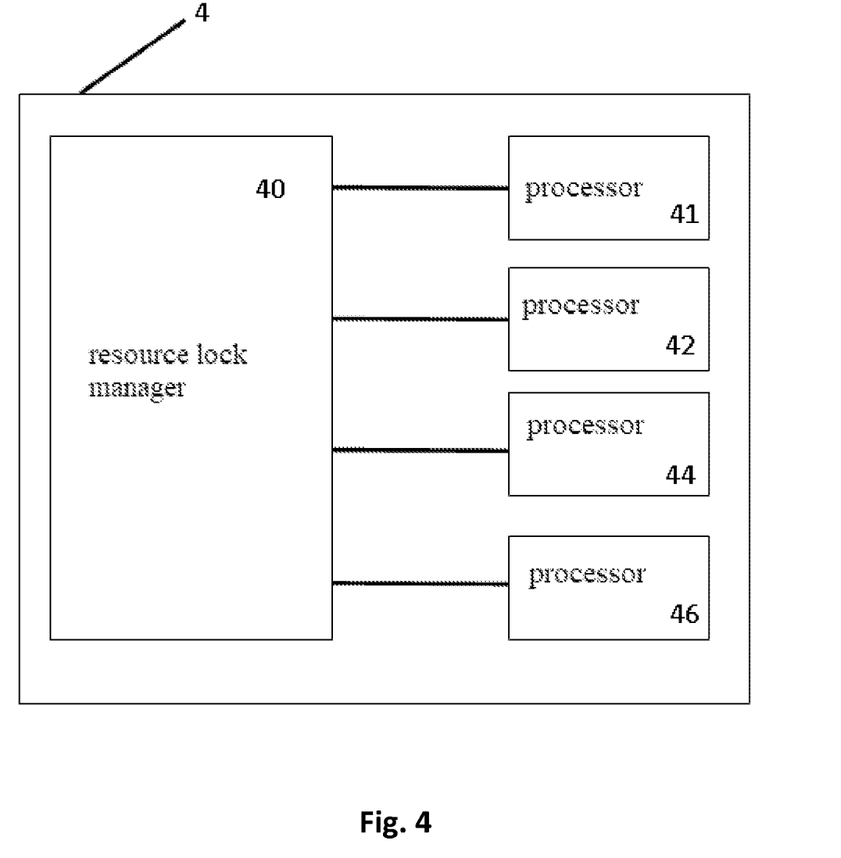
FIG. 4 is a structural diagram of a processing system 4 according to an embodiment of the current disclosure.

FIG. 4 is a schematic structural diagram of a processing system 4 according to an embodiment of the current disclosure. The processing system 4 includes a plurality of processors that independently execute instructions and a resource lock manager 40. In the example of FIG. 4, the application is elaborated by way of illustration, but not limitation, with an example that the processing system 4 includes four processors, namely a processor 41, a processor 42, a processor 44 and a processor 46. The processors 41, 42, 44 and 46 are respectively electrically connected with the resource lock manager 40. The resource lock manager 40 is configured to receive and respond to a resource lock request sent by any one of the plurality of processors. The response includes allocating the resource lock to the processor that sends the resource lock request, and/or recording the processors that sends the resource lock request but are not allocated the resource lock and sending request failure signals to them. For example, the processors 41, 42, 44 and 46 all send resource lock requests to the resource lock manager 40, and the resource lock manager 40 receives these resource lock requests and responds. For example, the processors 41 and 42 request an A resource lock of the same shared resource A to the resource lock manager 40, while the processor 44 requests a B resource lock of another resource B, and the processor 46 also requests the A resource lock of resource A. With regard to the A resource lock, the resource lock manager 40 allocates it to a requesting processor according to a preset allocation mechanism. In this example, by way of example, but not limitation, the preset allocation mechanism is based on the sequential order of requests, but in some cases, the urgency of the resource demand of the processor sent the request can also be considered. Since the processor 41 is the first processor requesting the A resource lock, the resource lock manager 40 allocate the A resource lock to the processor 41 requesting first, and sends signals to the processor 42 and processor 46 indicating that their requests are failed. With regard to the B resource lock, the resource lock manager 40 finds that the B resource lock is unavailable, and therefore signals the processor 44 that the request is failed. In this disclosure, the unavailability of the resource lock may be that the resource lock has been allocated to other processors, and the processor that has been allocated the resource lock is still using the resource corresponding to the resource lock and has not released the resource lock. It can also be unavailable due to other reasons. In addition to sending a signal indicating that the request is failed, the resource lock manager 40 also registers the processors that don't get the requested resource lock, that is, the processors failed to be allocated the resource lock, for example, by recording their identification ID, etc. In this application, the resource lock manager 40 registers the processors 42, 46 and 44. In some cases, the resource lock manager 40 may further register that the processor 46 is not allocated the A resource lock, and the processor 44 is not allocated the B resource lock.

According to some embodiments of the current disclosure, the processor is configured to release the corresponding resource lock when the use of the shared resource ends, and the resource lock manager is configured to send signals indicating that the resource lock has been released to the recorded processors not allocated the resource lock after the resource lock is released.

With continued reference to FIG. 4, the processor 41 is the processor that has been allocated the A resource lock. For other processors, the A resource as a shared resource is used by the processor 41, and other processors cannot use the A resource during it is used by the processor 41. The processor 41 releases the A resource lock after using the A resource. After receiving a signal that the A resource lock is released, the resource lock manager 40 sends signals indicating that the A resource lock is available to the registered processors 42 and 46 that have not been allocated the A resource lock. In this way, for example, the processor 42 and the processor 46 send requests for the A resource lock again, and the resource lock manager 40 executes the process described above again to allocate the A resource lock.

According to the example of this disclosure, a shared resource lock manager is set for the plurality of processors, and an inter-processor communication channel is established for each processor so that the shared resource lock manager globally manages requests for shared resources from different processors. When a shared resource is allocated to a processor, the resource lock of the shared resource is no longer allocated to other processors, and request failure signals are sent to those processors that have requested but are not allocated the resource lock, thus avoiding these processors from constantly sending out signals requesting the resource lock. In addition, according to this disclosure, when the resource lock is released, the resource lock manager sends the release information to the processors that have not been allocated the resource lock before, so that they can learn the resource lock state in time.

Figure 5:
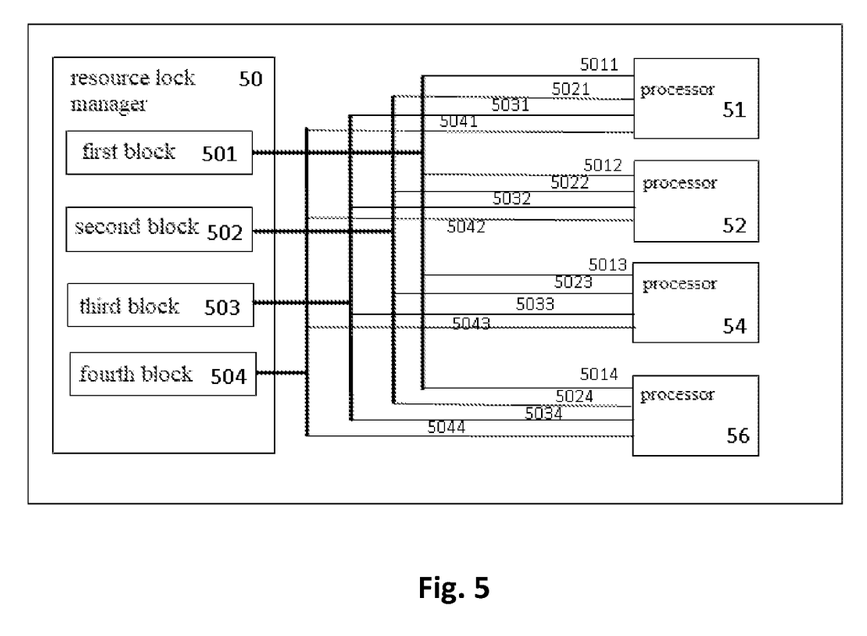
FIG. 5 illustrates a structural diagram of interconnection between a resource lock manager 50 including four blocks and various processors.

According to an example of the current disclosure, the resource lock manager can be divided into n blocks, and each of the n blocks sets an interrupt signal line for each of a plurality of processors. No matter which one of the N blocks, as long as the resource lock managed by the block is released, the block can send interrupt signals to the recorded processors that have not been allocated the released resource lock before through the interrupt signal line. FIG. 5 illustrates a structural diagram of interconnections between the resource lock manager 50 including four blocks and various processor. As shown in FIG. 5, the first block 501 is connected to the processors 51, 52, 54 and 56 through lines 5011-5014, respectively. The second block 502 is connected to the processors 51, 52, 54 and 56 through lines 5021-5024, respectively. The third block 503 is connected to the processors 51, 52, 54 and 56 through lines 5031 to 5034, respectively. The fourth block 504 is connected to the processors 51, 52, 54 and 56 through lines 5041 to 5044, respectively.

For example, if a resource lock is released in the second block 502, the second block 502 sends interrupt signals through lines 5022, 5023 and 5024 to the processors 52, 54 and 56 that have previously requested the resource lock, respectively. Upon receiving the interrupt signals, the processors 52, 54 and 56 can send requests for the resource lock again.

According to an example of the current disclosure, each block is configured with a resource use register, a pending register, an interrupt register and an interrupt enable register. The resource use register is configured to record the identifier of the processor allocated the resource lock, and clear the identifier when the processor releases the assigned resource lock. The pending register sets a register bit for each of the processors, and is configured to operate the register bit corresponding to a processor when the processor sends a resource lock request and is not allocated the resource lock. The interrupt register sets a register bit for each of the processors in a manner corresponding to the pending register, and is configured to perform a logical OR operation with the pending register when the requested resource lock is released and store an operation result. The interrupt enable register sets a register bit for each of the processors in a manner corresponding to the interrupt register. According to the example of this disclosure, the interrupt register performs an AND operation with the interrupt enable register after storing the operation result, and sends an interrupt through the interrupt signal line according to the operation result.

Returning to FIG. 5, the resource use register (not shown) of the first block 501 records the identifier of the processor allocated the resource lock, and clears the identifier when the processor releases the allocated resource lock. The pending register (not shown) of the first block 501 sets a register bit for each processor, i.e., the example processors 51, 52, 54 and 56, so that when the processor corresponding to the register bit requests a resource lock but is not allocated the resource lock, the register bit is operated for recording. For example, if the processors 52, 54, and 56 request the same lock resource but are not allocated the resource lock, write 1 to the register bits corresponding to processors 52, 54, and 56, respectively, to record. The interrupt register (not shown) of the first block 501 is set for the processors 51, 52, 54 and 56 in a manner corresponding to its pending register. When the same lock resources requested by the processors 52, 54 and 56 are released, the interrupt register performs logical OR operation with the pending register, so that the register bits of the interrupt register corresponding to the processors 52, 54 and 56 and the register bits of the pending register corresponding to the three processors are performed logical OR operation and the operation result is stored in the register bits of the interrupt register corresponding to the processors 52, 54 and 56. Further, the interrupt enable register (not shown) of the first block 501 is set for 50, 52, 54 and 56 in a manner corresponding to its interrupt register. After the interrupt register stores the operation result after the logical OR operation with the pending register, the interrupt register performs AND operation with the interrupt enable register, and sends an interrupt signal through a terminal signal line according to the operation result, for example, sends an interrupt signal when the operation result is 1. Although not described in detail, the working interaction between each register and each processor in other blocks is similar to that in the first block 501 of FIG. 5. For the sake of brevity, they will not be described one by one. In the example shown in FIG. 5, an interrupt line is set between each block and each processor, and when a resource lock is released in this block, this block informs the recorded processors through the interrupt lines and accurately informs the recorded processors through the corresponding interrupt lines by the set registers and the operations between them, thus avoiding setting a line between each resource lock and each processor and saving resources.

Figure 6:
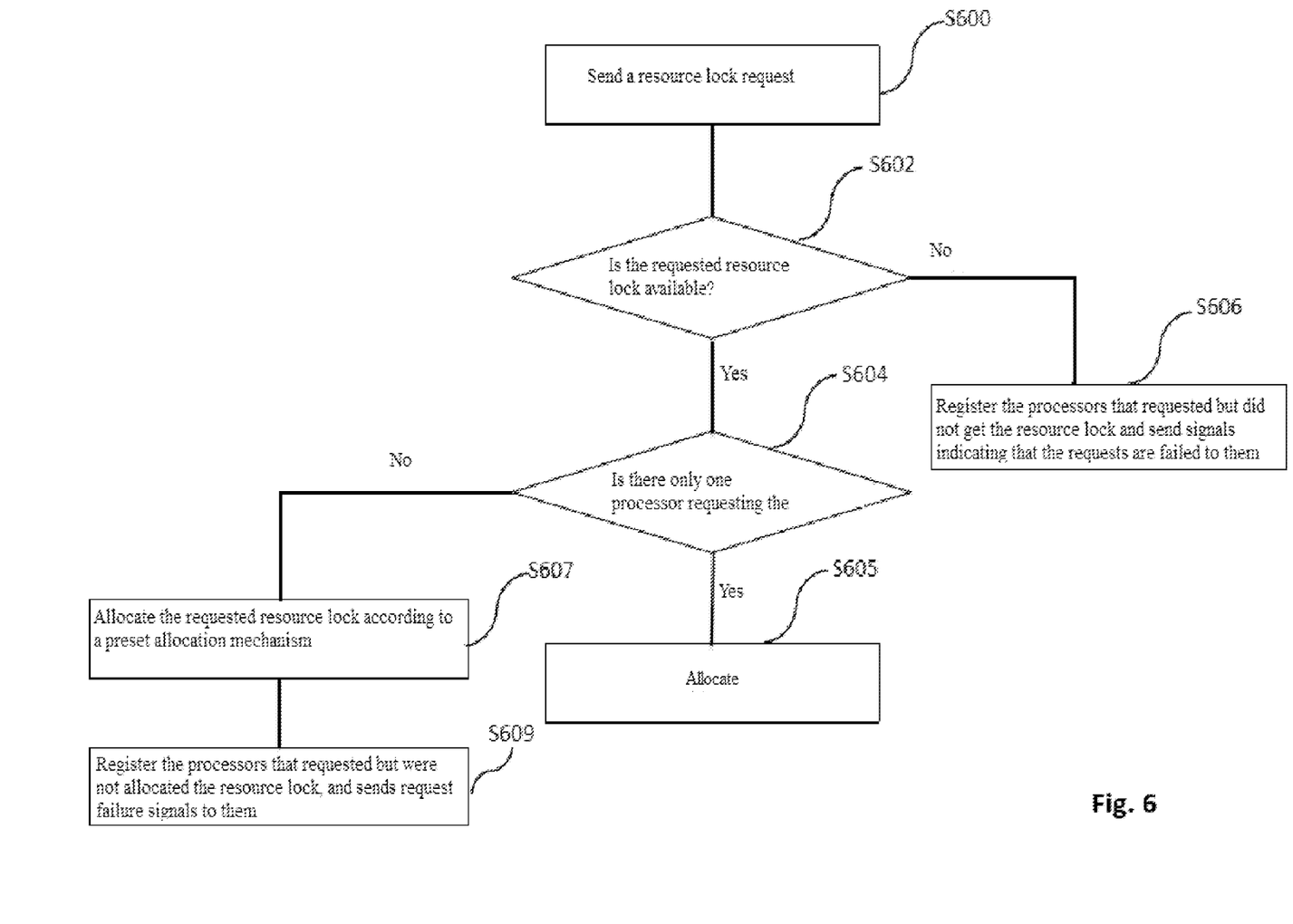
FIG. 6 is a flow diagram of a shared resource management method according to an example of the current disclosure.

FIG. 6 is a flow diagram of a shared resource management method according to an example of the present application. At step S600, the processor in the processing system that requests a resource lock sends a resource lock request to a resource lock manager. At step S602, the resource lock manager determines whether the requested resource lock is available. If the requested resource lock is available, proceed to step S604, and if the requested resource lock is unavailable, proceed to step S606.

At step S604, the resource lock manager further determines whether there is only one processor requesting the resource lock. If it is determined that there is only one processor requesting the resource lock, proceed to step S605, and if it is determined that there are multiple processors requesting the resource lock, proceed to step S607.

At step S605, the resource lock manager allocates the requested resource lock to the requesting processor. At step S606, the resource manager registers the processors that requested but did not get the resource lock and sends signals indicating that the requests are failed to the processors that requested the resource lock. At step S607, the resource lock manager allocates the requested resource lock to one of the requesting processors according to a preset allocation mechanism, and proceeds to step S609. At step S609, the resource lock manager registers the processors that requested but were not allocated the resource lock, and sends request failure signals to them. According to this example, the preset allocation mechanism is, for example, according to a time sequence of requesting the resource lock.

According to an example of the disclosure, the resource lock manager is further configured to send signals indicating that the resource lock is available to the registered processors that did not get the requested resource lock when the requested resource lock is available, for example, so that they can request the resource lock again. As for the availability and unavailability of resource lock, as mentioned above, unavailability may be that the lock has been allocated to other processor and has not been released, or it may be unavailable for other reasons.

The method shown in FIG. 6 can be implemented in the processing system shown in FIG. 4, that is, the resource lock manager 40 in FIG. 4 processes the requests for resource locks from the processors 41, 42, 44 and 46 in FIG. 4. The method shown in FIG. 6 can also be implemented in the processing system shown in FIG. 5, that is, the resource manager 50 shown in FIG. 5 processes the requests for resource locks from the processors 51, 52, 54 and 56 in FIG. 5.

According to an example of the disclosure, a processing system is also provided. The processing system comprises a resource lock manager, a plurality of processors which independently execute instructions, and a plurality of registers which are arranged corresponding to the plurality of processors. The resource lock manager in this example is, for example, the resource lock manager described above with reference to FIG. 4 or FIG. 5, and the processors and registers are, for example, a plurality of processors and a plurality of registers described with reference to FIG. 1, except that in this example, when using shared resources, the multiple processors will send requests to the resource lock manager and receive responses from the resource lock manager as described with reference to FIG. 4.

Figure 7:
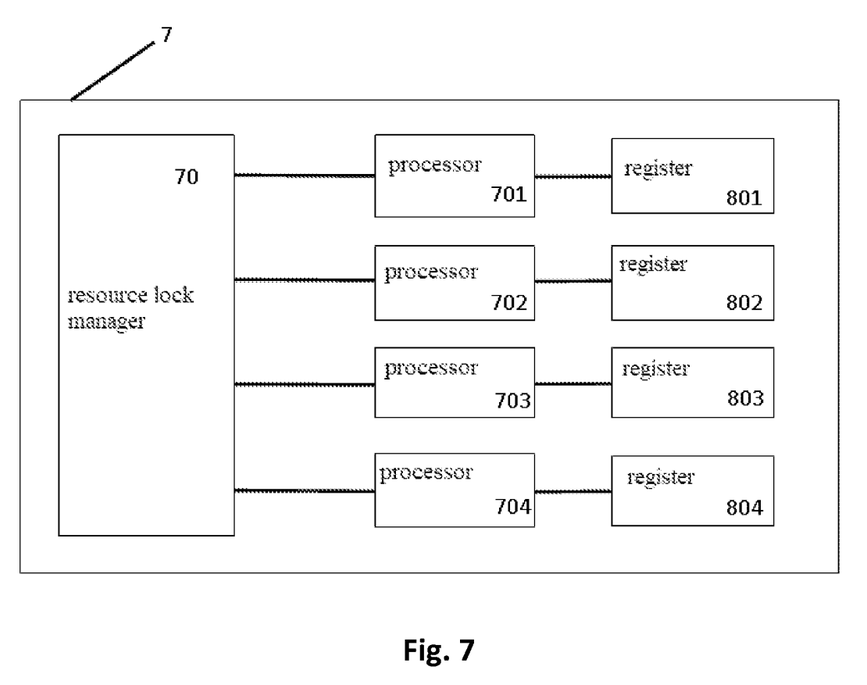
FIG. 7 is a schematic structural diagram of a processing system 7 according to another embodiment of the current disclosure.

FIG. 7 is a schematic diagram of a processing system according to this example. By way of example, but not limitation, the example given in FIG. 7 includes four processors, namely a processor 701, a processor 702, a processor 703 and a processor 704. Furthermore, as shown in the figure, the processing system 7 includes a resource lock manager 70, and four registers corresponding to the processors 701, 702, 703 and 704, namely a register 801, a register 802, a register 803 and a register 804.

In this example, the processors 701, 702, 703 and 704 correspond to the registers 801, 802, 803 and 804, respectively. The register 801 sets first register bits for the processors 702, 703 and 704 other than its corresponding processor 701, the register 803 sets first register bits for the processors 702, 701 and 704 other than its corresponding processor 703 and the register 804 sets first register bits for the processors 701, 702 and 703 other than its corresponding processor 704. The processor 701 sends an event request to a processor corresponding to a register by writing the first register bit set for it in the register 802, register 803 or register 804. The processor 702 sends an event request to a processor corresponding to a register by writing the first register bit set for it in the register 801, register 803 or register 804. The processor 703 sends an event request to a processor corresponding to a register by writing the first register bit set for it in the register 801, register 802 or register 804. The processor 704 sends an event request to a processor corresponding to a register by writing the first register bit set for it in the register 801, register 802 or register 803. Each processor of the plurality of processors is configured to be able to read the first register bit in its corresponding register, so as to acquire the event requests from the remaining processors or other processors for it.

Each of the plurality of registers is also configured to set second register bits for other processors except the corresponding processor. The register 801 for the processor 701 sets second register bits for the processors 702, 703 and 704, the register 802 for the processor 702 sets second register bits for the processors 701, 702 and 704, the register 803 for the processor 703 sets second register bits for the processors 701, 702 and 704, respectively. The second register bits are set to enable other processors by the processor corresponding to this register. For example, the processor 701 enables the processor 702 by writing 1 to the second register bit set for the processor 702 in the register 801, that is, the processor 702 can send an event request to the processor 701 by writing 1 to the first bit set for it in the register 801.

The interactions between the processors 701, 702, 703, and 704 and the registers 801, 802, 803, and 804 are similar to the interactions between the processors 10, 12, 14, and 16 and the registers 20, 22, 24, and 26 described above with reference to FIGS. 1 and 2, so they will not be described again.

The resource lock manager 70 is electrically connected with each of the processors 701, 702, 703 and 704. The source lock manager 70 is configured to receive and respond to a resource lock request sent by any one of the processors 701, 702, 703 and 704. The response includes allocating a resource lock to the processor that sent the resource lock request, and/or recording the processors that send the resource lock request but are not allocated the resource lock and sending request failure signals to them. The configuration of the resource lock manager 70, the configuration of each of processors 701, 702, 703 and 704, the interactions between the resource lock manager 70 and the processors 701, 702, 703 and 704 are similar to the configuration of the resource manager 40, the respective configurations of the processors 41, 42, 44 and 46 and the interactions between the resource manager 40 and the processors 41, 42, 44 and 46 described with reference to FIG. 4, which will not be described in detail herein.

In all the examples in this disclosure, each processor may only include one core or integrate one core, or may include or integrate more than two cores (including two). As such, it should be understood that the examples of this disclosure are applicable to the case where each processor is a core. That is to say, the technical scheme is still feasible if the processor in the above description is replaced with a core.

The above-mentioned embodiments only express several embodiments of the current disclosure, and their descriptions are specific and detailed, but they cannot be understood as limiting the scope of the current disclosure. It should be pointed out that, for those of ordinary skill in the field, without departing from the concept of the current disclosure, several modifications and improvements can be made, which belong to the protection scope of the current disclosure. Therefore, the scope of protection of the patent of the current disclosure shall be subject to the appended claims.

What is claimed is:

1. A processing system comprising:
a plurality of processors independently executing instructions; and
a plurality of registers, wherein each processor is associated with a corresponding register from the plurality of registers, each register including a set of first register bits corresponding to each of the plurality of processors;
wherein each register of the plurality of registers is configured to respectively set the first set of register bits for other processors except the corresponding processor;
wherein each processor of the plurality of processors is configured to write the first set of register bits to indicate event requests for the other processors in the corresponding register;
wherein each register of the plurality of registers is further configured to respectively set a second set of register bits for the other processors except the corresponding processor;
wherein each processor of the plurality of processors is further configured to enable the other processors by writing the second set of register bits in the corresponding register;
wherein each processor of the plurality of processors is further configured to read the first set of register bits of the corresponding register to acquire the event requests from the other processors; and
wherein each processor of the plurality of processors is further configured to query an inter-processor storage area for information related to the event requests before executing the event requests and after acquiring the event requests from the other processors.

2. The processing system of claim 1, wherein the inter-processor storage area is set for any two processors of the plurality of processors and is configured to store the information related to the event requests.

3. The processing system of claim 2, wherein each processor of the plurality of processors is further configured to write the information related to the event requests to the inter-processor storage area before writing the first set of register bits.

4. The processing system of claim 1, wherein each processor of the plurality of processors can be any one of the following: a processor including one core, a processor including two or more cores.

5. An inter-processor communication method executed by a processing system comprising a plurality of processors and a plurality of registers, wherein each processor is associated with a corresponding register from the plurality of registers, each register including a set of first register bits corresponding to each of the plurality of processors, the method comprising:
writing information related a plurality of event requests of a source processor to an inter-processor storage area between the source processor and a target processor of the plurality of processors and subsequently writing to the first set of register bits of a source register of the plurality of registers corresponding to the source processor;
writing to the first set of register bits of a target register of the plurality of registers corresponding to the target processor, the target processor being requested to process an event request received from the source processor;
sending an interrupt request to the target processor by the target register;

reading, by the target processor and in response to receiving the interrupt request, the source register to acquire event requests from other processors of the plurality of processors and subsequently reading the information related to the plurality of event requests of the source processor from the inter-processor storage area;

clearing the first set of register bits after reading the source register; and setting, by each of register of the plurality of registers, a second set of register bits for the other processors of the plurality of processors except the corresponding processor.

6. The inter-processor communication method of 5, wherein the inter-processor storage area is set for any two processors of the plurality of processors, and is configured to store the information related to the plurality of event requests of the source processor.

7. A shared resource management method executed by a resource lock manager of a processing system including a plurality of processors, the method comprising:

receiving a shared resource lock request from at least two processors of the plurality of processors;

allocating a shared resource lock to one of the processors requesting the shared resource lock according to a preset allocation mechanism when the shared resource lock is available and at least two processors of the plurality of processors request the shared resource lock;

recording the other processors of the plurality of processors that failed to be allocated the requested shared resource lock;

sending the recorded processors signals indicating that their requests for the shared resource lock failed, wherein the resource lock manager is divided into a number of blocks each of which are provided with a respective interrupt signal line for electrically connecting with the plurality of processors respectively; and sending interrupt signals to the recorded processors through the respective interrupt signal line when the shared resource lock is released based on an operation result, wherein each of the blocks is configured with an interrupt register, the interrupt register configured to:

set a register bit in the interrupt register for each of the plurality of processors, perform a logical OR operation with a pending register, the logical OR operation producing the operation result, store the operation result of the logical OR operation in the register bits of the interrupt register when the requested shared resource lock is released, and perform a logical AND operation with an interrupt enable register after storing the operation result.

8. The shared resource management method of claim 7, wherein the preset allocation mechanism is to allocate the shared resource lock according to a time sequence of when each processor of the plurality of processors requested the shared resource lock.

9. The shared resource management method of claim 7, wherein the preset allocation mechanism is to allocate the shared resource lock according to an urgency of a resource request demand of each processor of the requesting processors.

10. The shared resource management method of claim 7, wherein each processor of the plurality of processors can be any one of the following: a processor including one core, a processor including two or more cores.

11. A processing system comprising:

a plurality of processors which independently execute instructions, each processor configured to acquire a resource lock before using a resource shared among the plurality of processors; and a resource lock manager divided into a number of blocks each of which are provided with a respective interrupt signal line for electrically connecting with the plurality of processors respectively, the resource lock manager configured to:

receive a resource lock request sent by at least two processors of the plurality of processors;

respond to the resource lock request by allocating the resource lock to one of the processors that sent the resource lock request;

record the other processors that sent the resource lock request but were not allocated the resource lock;

send the recorded processors signals indicating that their requests have failed; and send interrupt signals to the recorded processors through the respective interrupt signal line when the resource lock is released based on an operation result, wherein each of the blocks is configured with an interrupt register, the interrupt register configured to:

set a register bit in the interrupt register for each processor of the plurality of processors, perform a logical OR operation with a pending register, the logical OR operation producing the operation result, store the operation result of the logical OR operation in the register bits of the interrupt register when the requested resource lock is released, and perform a logical AND operation with an interrupt enable register after storing the operation result.

12. The processing system of claim 11, wherein each processor of the plurality of processors is configured to release the resource lock when the use of the shared resource ends.

13. The processing system of claim 12, wherein each of the blocks is further configured with:

a resource use register configured to record in the resource use register an identifier of the processor that is allocated the resource lock and to clear the identifier when the processor releases the allocated resource lock;

a pending register configured to set a register bit in the pending register for each of the processors and to set a register bit in the pending register corresponding to a processor that sent a resource lock request and was not allocated the resource lock; and an interrupt enable register configured to set a register bit for each processor of the processors in the interrupt enable register.

14. The processing system of claim 11, further comprising:

a plurality of registers, wherein each of the registers corresponds to a respective processor of the plurality of processors and is configured to respectively set first register bits of the registers for other processors except the corresponding processor, wherein the other processors can write the first register bits to indicate event requests, and wherein each processor of the plurality of processors is configured to read the first register bits of the corresponding register to acquire the event requests.

15. The processing system of claim 14, wherein each register of the plurality of registers is further configured to respectively set second register bits for the other processors except the corresponding processor, and wherein each processor of the plurality of processors is configured to enable the other processors by operating the second register bits in the corresponding register.

16. The processing system of claim 14, wherein an inter-processor storage area is set for any two processors of the plurality of processors, the inter-processor storage area is configured to store information related to the event requests when the event requests are between the two processors.

17. The processing system of claim 16, wherein each processor of the processors is further configured to write information related to the event requests to the inter-processor storage area before writing the first register bits when event requests are between the two processors; each processor of the plurality of processors is further configured to query the inter-processor storage area for the information related to the event requests before executing the event requests and after acquiring the event requests from the other processors.

18. The processing system of claim 11, wherein each processor of the plurality of processors can be any one of the following: a processor including one core, a processor including two or more cores.

19. The processing system of claim 11, wherein the resource lock is allocated according to a time sequence of when each processor of the plurality of processors requested the resource lock.

20. The processing system of claim 11, wherein the resource lock is allocated according to an urgency of a resource request demand of each processor of the requesting processors.

* * * * *